United States Patent
Benhamouda

(12) 
(10) Patent No.: US 9,678,606 B2
(45) Date of Patent: Jun. 13, 2017

(54) METHOD AND DEVICE FOR DETERMINING A TOUCH GESTURE

(75) Inventor: Franck Benhamouda, Plaisir (FR)

(73) Assignee: ELO TOUCH SOLUTIONS, INC., Milpitas, CA (US)

( * ) Notice: Subject to any disclaimer, the term of this patent is extended or adjusted under 35 U.S.C. 154(b) by 593 days.

(21) Appl. No.: 13/641,825

(22) PCT Filed: Apr. 19, 2011

(86) PCT No.: PCT/EP2011/001982
§ 371 (c)(1),
(2), (4) Date: Apr. 15, 2013

(87) PCT Pub. No.: WO2011/131343
PCT Pub. Date: Oct. 27, 2011

(65) Prior Publication Data
US 2013/0194226 A1      Aug. 1, 2013

(30) Foreign Application Priority Data
Apr. 19, 2010   (EP) .................................. 10290210

(51) Int. Cl.
*G09G 5/00*     (2006.01)
*G06F 3/044*    (2006.01)
*G06F 3/0488*   (2013.01)

(52) U.S. Cl.
CPC ............ *G06F 3/044* (2013.01); *G06F 3/0488* (2013.01); *G06F 2203/04104* (2013.01); *G06F 2203/04808* (2013.01)

(58) Field of Classification Search
CPC ...... G06F 3/03547; G06F 3/041; G06F 3/043; G06F 3/044

USPC .................................................. 345/173–177
See application file for complete search history.

(56) References Cited

U.S. PATENT DOCUMENTS

| | | | |
|---|---|---|---|
| 2007/0252821 A1 | 11/2007 | Hollemans et al. | |
| 2008/0168403 A1* | 7/2008 | Westerman et al. | 715/863 |
| 2009/0146963 A1 | 6/2009 | Yeh et al. | |
| 2009/0273571 A1 | 11/2009 | Bowens | |
| 2009/0309847 A1* | 12/2009 | Russell | G06F 3/0416 345/173 |

FOREIGN PATENT DOCUMENTS

| | | |
|---|---|---|
| EP | 1717682 A2 | 11/2006 |
| TW | 2006-11185 A | 4/2006 |
| TW | 2009-25966 A | 6/2009 |

OTHER PUBLICATIONS

Written Opinion from International Application No. PCT/EP2011/001982, mailed Jun. 7, 2011.

(Continued)

*Primary Examiner* — Jennifer Nguyen
(74) *Attorney, Agent, or Firm* — Sterne, Kessler, Goldstein & Fox P.L.L.C.

(57) ABSTRACT

The invention relates to a device, in particular, a touch sensitive device, and more in particular, a single-touch sensitive device configured to recognize gestures, such as zoom, rotate, flick, using specific characteristics based on a single-touch localization system. The invention also relates to a method for recognizing/identifying gestures, such as zoom, rotate, flick, in a low-end device equipped with such as a single-touch sensitive device which is able to recognize one single point at a time.

17 Claims, 6 Drawing Sheets

(56) References Cited

OTHER PUBLICATIONS

Figure 1:
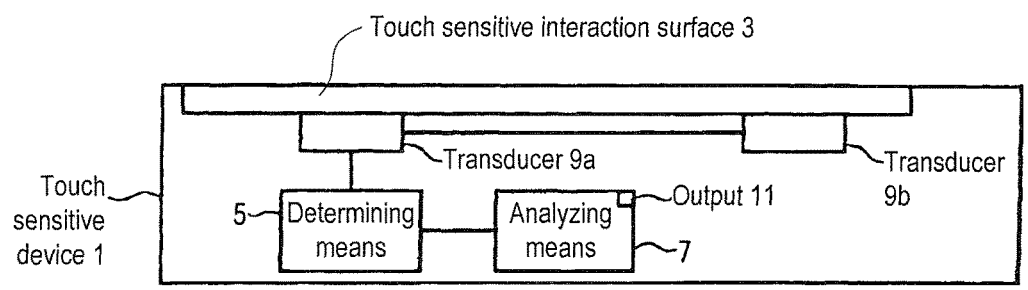

International Search Report for Application No. PCT/EP2011/001982 dated Jul. 6, 2011.
European Search Report for Application No. EP 10 29 0210 dated Sep. 9, 2010.

* cited by examiner

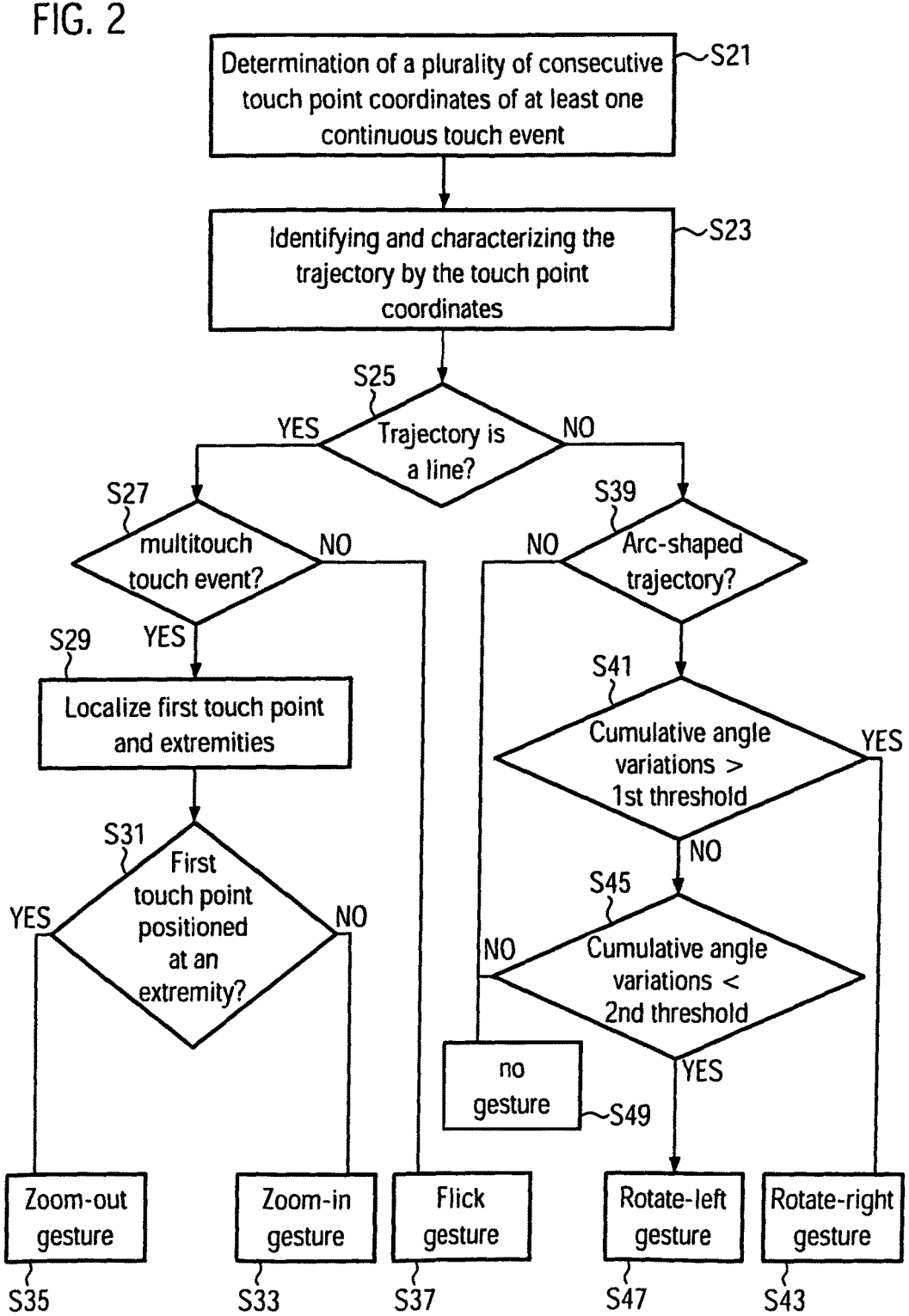

METHOD AND DEVICE FOR DETERMINING A TOUCH GESTURE

The invention relates to a method for determining a user's touch gesture, like zoom, rotate or flick; in a touch sensitive device comprising an interaction surface and a means for analyzing a touch event. The invention furthermore also relates to a corresponding device.

Touch gestures on the interaction surface of a touch sensitive device relate to a continuous touch event during which a user touches the touch sensitive device either directly or indirectly over a certain time period and, at the same time, typically moves over the interaction surface. Such devices capable of determining a user's touch gesture are known in the art. The operating systems for recognizing sophisticated touch gestures are typically integrated devices having a touch sensitive interface with a multi-touch sensitive functionality. The operating systems require multi-touch capabilities because a plurality of complex gestures, like selecting, browsing, highlighting but also zooming and rotating, need to be determined out of a touch event which, for some of these gestures, e.g. zooming, relates to moving two figures simultaneously over the interaction surface of the touch sensitive device. However, having such multi-touch capabilities increases considerably the cost of the device and therefore is typically reserved for high-end devices.

Starting there from, it is therefore the object of this invention to provide a method and device for determining a user's touch gesture that is simplified so that it can, amongst others, also be implemented in low-end devices for which market conditions do not allow the use of highly sophisticated touch screen solutions.

The inventive method for determining a user's touch gesture in a touch sensitive device comprising an interaction surface and means capable of only analyzing the location of a single touch point of a continuous touch event or a continuous multi touch event on the interaction surface at a time, comprises the steps of: a) determining a plurality of consecutive touch point coordinates of at least one continuous touch event on the interaction surface during the user's gesture and b) determining a predetermined single-touch pattern or a multi-touch pattern based on a predetermined relation between the touch point coordinates determined in step a), and c) attributing a predetermined action corresponding to the touch pattern determined during step b).

With the method according to the invention, even though only using single-touch sensitive functionalities being capable of analyzing only one touch at a time, it becomes possible to even simulate multi-touch capabilities using the positional and/or temporal relationship between a plurality of touch point locations. As a consequence, even in low end applications, one does not have to renounce to more complex gestures like zooming as, due to the single touch technology used, the costs for the device can be kept lower compared to a multi-touch solution. In case, the user uses more than one finger on the interaction surface, the touch point interaction coordinates determined during step b) will be distributed among the trajectories.

In this context, the term "touch event" relates to any interaction of a user with the touch sensitive interaction surface. It can be a simple tap on the surface, a sliding action, a hold action or a multi touch event during which at least two fingers or two styluses interact with the interaction surface at the same time. The term "continuous touch event" relates to a sliding or hold action, e.g. of one or more fingers of a user on the interaction surface. The term "touch point coordinate" relates to the coordinates of the location of one point on the trajectory of the touch event determined by the analyzing means.

The step a) of the method of the Present invention can be carried out during a predetermined duration, in particular during 400 to 800 ms. The step b) of the method of the present invention can be carried out if the number of determined touch point coordinates is greater than a minimum threshold value and/or if the distance between at least two touch point coordinates is greater than a predetermined value. Thus, before entering in the analysis during step b), it is determined whether the touch event can effectively relate to a gesture or not, thereby reducing calculation power. Indeed, if the number of touch point coordinates is too low or the distance between touch locations coordinates too small, the touch event of a user cannot relate to a complex gesture but to a simple tap on the interaction surface.

The step b) of the method can comprise analyzing whether the touch point coordinates are essentially positioned on a line or not. To do so algorithms, like linear regression, are applied to the touch point coordinates determined during step a). If the touch point coordinates are positioned on a line, some complex gestures, like rotation, during which one or two fingers describe an arc shaped touch event on the interaction surface, can be excluded without the necessity of a complex analysis.

Advantageously, step b) can comprise identifying that the touch point coordinates are essentially positioned on a line by determining whether a predetermined number of consecutive determined touch point coordinates satisfy the relationship:

$$y_i = ax_i + b \pm \Delta \text{ or } x_i = c \pm \Delta$$

wherein, $y_i$ and $x_i$ correspond to the touch point coordinates of touch point i in the predetermined number of consecutive touch point coordinates, a is a first constant, in particular an integer, b is a second constant, $\Delta$ is a third constant and c is a fourth constant, and wherein a is limited to a predetermined number of different discrete values, in particular less than 50, more in particular less than 10, even more in particular less than 5. For this kind of data analysis the computational effort can be kept low so that the electronic devices necessary to carry out the analysis can be simple. To optimize the available computational power, the amount of different values shall be a power of two, thus e.g. 4, 8, 16 or 32.

In this context it can be further preferred to only use a small number of predetermined values so that the equation can be easily processed by a low-end processor. Using one out of a=0 and a=±1 or a=0, ±½, ±1, ±2 for parameter a makes the system only capable of identifying at most 4 types or 8 types of linear gestures, which are up-down, left right, and diagonal left and diagonal right and, in the second variant, with one further resolved linear direction in-between those directions. For most of the applications this is, however, sufficient. Thus the analysis can be further simplified. Thus, even for low end applications, it becomes possible to provide linear gestures identifying capability to the touch sensitive device.

Preferably, if in step b) it is determined that the touch point coordinates are positioned on a line, then the method according to the invention can comprise an additional step b1) of determining whether or not the continuous touch event relates to a multi-touch event, in particular a zoom event, by analyzing whether or not two essentially linear, in particular simultaneous, trajectories with different directions are identified in the continuous touch event. Even though only a single-touch functionality is used to obtain the touch point coordinates, it is nevertheless possible to simulate a two finger zooming action by looking at the directional properties of the relationship between the various coordinates of the plurality of touch points. The term "simultaneous" in this context, relates to the presence of two trajectories, e.g. attributed to two fingers, on the interaction surface at the same time, to be able to discriminate with respect to a movement where one finger simply moves in one direction and then in a different direction.

Preferably, step b1) can further comprise a step of deciding that the continuous touch event relates to a multi-touch touch event if at least one, preferably more than one, changeover from increasing to decreasing coordinates $x_i$, and/or $y_i$ and/or at least one, preferably more than one, changeover from decreasing to increasing coordinates $x_i$, and/or $y_i$ is determined. The observation of such a changeover is an easy, yet reliable way of identifying a multi-touch gesture using only a single touch analyzing capability.

Preferably, the method can comprise determining vectors for pairs of touch point coordinates, wherein the starting point of the vector relates to touch point coordinates of an earlier touch point in the continuous touch event compared to the end point of the vector. Even further preferred, step b1) can further comprise determining scalar products of pairs of vectors and deciding that a multi-touch event occurred when scalar products with opposing signs are determined. By analyzing the inter vector properties, the identification of a multi-touch gesture using only a single touch analyzing capability is enabled.

According to an inventive embodiment, if, in step b) it is decided that the touch point coordinates are positioned on a line, step b) comprises a step b2) of deciding that the multi-touch event relates to a zoom-in event, if the touch point coordinates of the first touch point can be positioned within the line defined by the touch point coordinates at the extremities of the line, and deciding that the multi-touch touch event relates to a zoom-out event, if the touch point coordinates of the first touch point are positioned at an extremity of the line defined by the touch point coordinates and attributing a zoom-in or zoom-out action in step c). Advantage is taken of geometric properties of the zoom-in, zoom-out gestures to identify one of the two gestures out of a series of touch point coordinates determined using a single touch analyzing means.

The step b) of the method can comprise analyzing whether the touch point coordinates follow an arc shaped trajectory or not. Preferably, if the touch point coordinates follow an arc shaped trajectory, the continuous touch event can relate to a rotation event.

The step b) can comprise determining vectors for pairs of touch point coordinates, in particular for all pairs of touch points or for immediately successive touch point coordinates, wherein the starting point of the vector relates to touch point coordinates of an earlier touch point in the continuous touch event compared to the end point of the vector. Here immediately successive relates to the time domain, thus, in the second variant, vectors are determined for a first touch point at location $t_i$ and the next touch point at time stamp $t_{i+1}$. Based on the obtained vector information, in particular the direction of the vectors, gestures can be identified in step b) without needing excessive computational power.

The method can comprise a step of adding the angles between a succession of a predetermined number of vectors and, if the sum exceeds a predetermined threshold, a rotation action is attributed in step c). The rotation action can be proportional to the angular sum or can be a fixed value.

Thus, based on the vector properties, it is again possible to identify a complex gesture using only single touch functionality.

Preferably, a rotation action in the positive sense is attributed in case the sum exceeds a first threshold and a rotation action in the negative sense is attributed in case the sum is below a second threshold.

Advantageously, step b) can comprise determining the distance $d1_i$ between touch point locations i and i+2 and the distance $d2_i$ between touch point location i+1 the line defined by touch point locations i and i+2 and deciding that the touch event relates to an arc shaped trajectory if $d1_i/d2_i = d \pm \Delta$ and/or $d1_i*d1_i/d2_i = e \pm \Delta$, for a predetermined number of consecutive touch point locations, wherein i, i+1 and i+2 indicate three consecutive touch point locations, d and e are a constant and $\Delta$ a predetermined parameter. This method provides a simple yet stable way to analyze an arc shaped gesture, thus not needing excessive computational power.

According to an alternative embodiment, only a selection of touch point coordinates are used to identify arc shaped gestures. Further preferred, the arc shaped gesture is analyzed by calculating the ratio between $(x_i - x_{i+1})$ and $(y_i - y_{i+1})$ and summing up the values. A rotation is decided only in case all angles estimated this way have the same sign.

Preferably, if the touch point coordinates are positioned on a line, the method according to the invention can decide that the continuous touch event relates to a flick event, in case only one direction is identified in the linear trajectory. Thus, in the absence of a zooming operation or a rotation action, an additional linear gesture can be exploited to shift from e.g. one screen to the next.

The invention also relates to a computer program product, comprising one or more computer readable media having computer-executable instructions for performing the steps of the method according to the invention.

The invention also relates to a touch sensitive device comprising a touch sensitive interaction surface and a means for determining a location of an interaction on the surface, wherein the means can only identify the location of one touch point at a time and a means for analyzing a succession of touch point locations of a continuous touch event on the interaction surface according to the method of the invention. With this device, the advantageous of the method and its variants can also be achieved.

Advantageously, in the touch sensitive device, the touch point coordinates are determined based on an analysis of acoustic signals. The acoustic technology based on the properties of acoustic signals travelling as bending waves in the interaction surface is particularly advantageous, as the resolution is typically only limited by the computational power. Thus, depending on the power available in a given device, the number of touch point coordinates which can be determined within a trajectory can be increased or reduced, without, however, loosing the possibility to determine complex gestures out of the trajectory analysed by a single-touch functionality.

Figure 3:
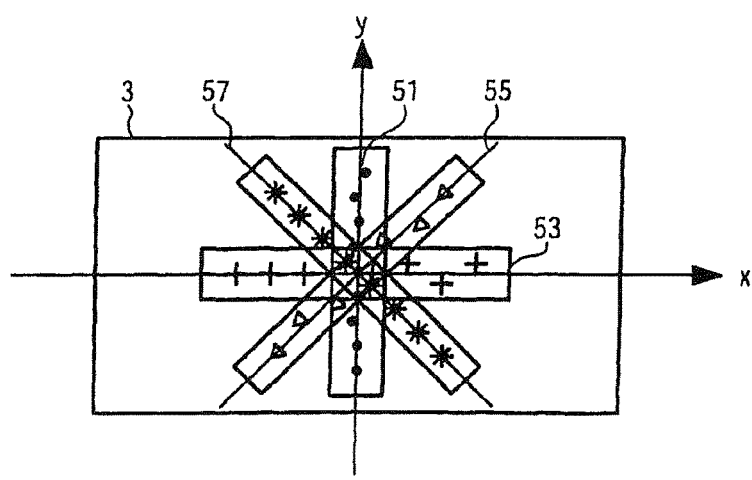
Figure 4:
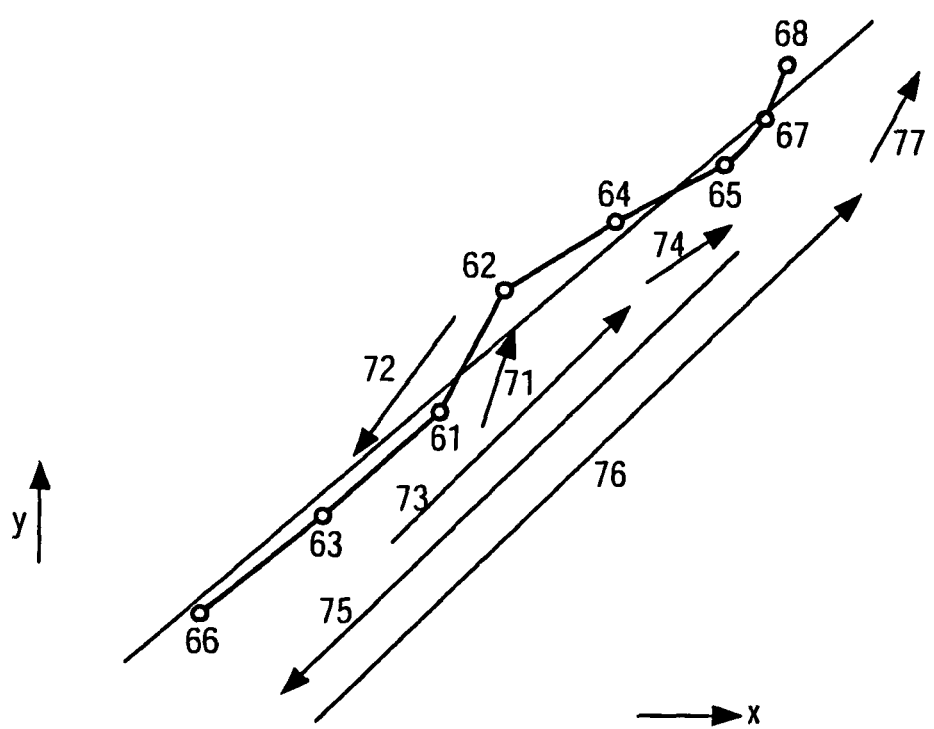
Figure 5:
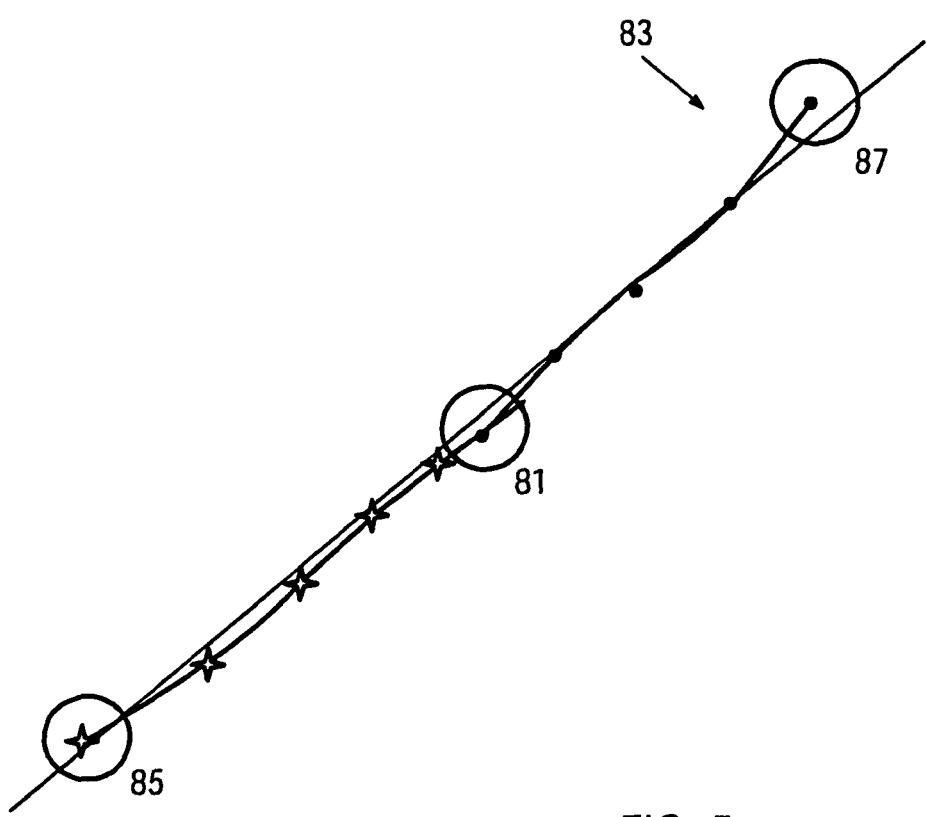
Figure 6:
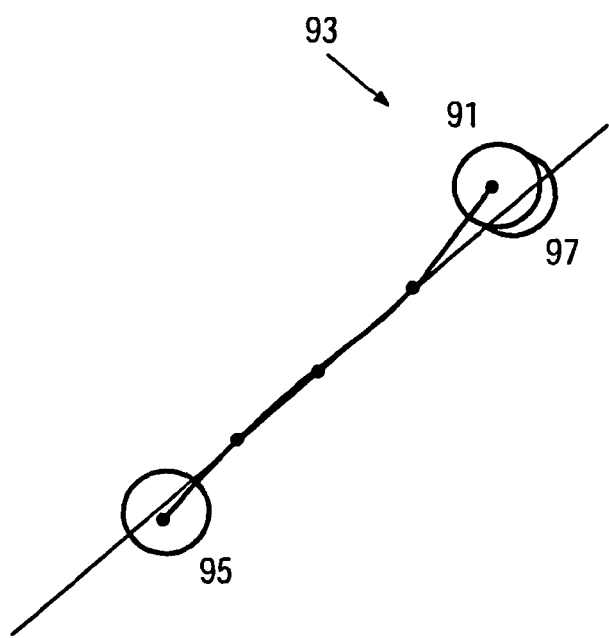
Figure 7:
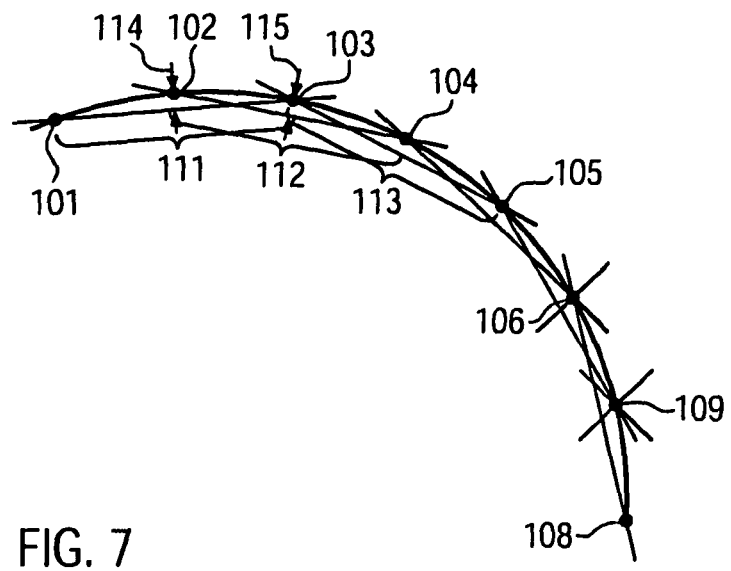
Figure 8:
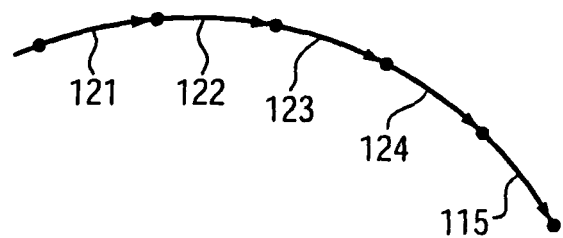

Advantageous embodiments of the invention will now be described in relation to the enclosed Figures:

FIG. 1 illustrates an embodiment of a touch sensitive device according to the invention, FIG. 2 illustrates a method for determining a user's touch gesture according to an embodiment of the invention, FIG. 3 illustrates an inventive method of determining whether touch point locations are positioned on a line, FIG. 4 illustrates the analysis of a multi-touch touch event according to the invention, FIG. 5 illustrates a zoom-in event according to an embodiment of the invention, FIG. 6 illustrates a zoom-out event according to an embodiment of the invention, FIG. 7 illustrates a rotation event analyzed according to an embodiment of the invention, and FIG. 8 illustrates a rotation event analyzed according to a variant.

As illustrated in FIG. 1, an inventive touch sensitive device 1, like a consumer electronic device e.g. mobile phones, electronic books, MP3 players, screens for computers or other electronic devices, comprises a touch sensitive interaction surface 3 and a determining means 5 for determining a location of a touch event on the interface 3. According to the invention, the determining means 5 can only identify the location of one touch point at a time using a single touch localization system. The touch sensitive device 1 further comprises an analyzing means 7 for analyzing a succession of touch point locations of a continuous touch event to determine gestures of a user of the device 1 on the interaction surface 3. Preferably, the touch point locations are determined by an analysis of acoustic signals propagating as bending waves in the touch sensitive interface 3 after a touch event and which are converted into electric signals using at least one transducer (here two, 9a and 9b), e.g. piezoelectric transducers.

The invention is, however, not limited to acoustic touch location determination techniques, and other technologies like capacitive or surface acoustic could also be used according to the invention. Once a gesture has been identified, the analyzing means 7 can attribute a corresponding action to the gesture of the user, like a zoom-in or zoom-out or rotate action and output a corresponding instruction via its output 11.

The method, e.g. used by the touch sensitive device 1 as illustrated in FIG. 1, according to which the gestures are identified according to the invention, will now be described in FIG. 2.

According to step 21 of the inventive method, a plurality of consecutive touch point coordinates of at least one continuous touch event, e.g. a sliding action on the interaction surface 3 by the user using one or more fingers, are determined by the determining means 5. Step 21 is carried out during a predetermined duration, in particular, between 400 to 800 ms, more in particular, of at least 600 ms, corresponding to typical time durations of a gesture realized by a user on the interaction surface 3.

In step 23 of the inventive method, the determined touch point coordinates are analyzed by the analyzing means 7. The analyzing step identifies and characterizes the trajectory formed by the touch point coordinates. According to a preferred variant, this step is only carried out if the number of determined touch point coordinates obtained during the predetermined duration is greater than a minimum threshold value. This ensures that indeed a gesture type input was provided by the user. Yet according to a further variant, step 23 is only carried out, if the distance between at least two touch point coordinates is greater than a predetermined value again to ensure that a gesture type input was provided by the user. Indeed, if the cloud of touch point coordinates is within the predetermined value, then the user hit several times the same location or makes a hold action at one location. The minimum threshold value can take values of 4 touches and the predetermined value can take values of one percent of the size of the diagonal of the screen.

In step 25 of the method, it is decided by the analyzing means 7 whether the touch point coordinates are essentially positioned on a line or not.

FIG. 3 illustrates the process used to identify whether the touch point coordinates are essentially positioned on a line or not.

FIG. 3 illustrates the interaction surface 3 and coordinates axes x and y. Further more are illustrated four different trajectories 51, 53, 55 and 57 corresponding to four different continuous touch events. According to step a) of claim 1, for each trajectory 51, 53, 55 and 57 a plurality of consecutive touch point coordinates are determined by the analyzing means 7, illustrated in FIG. 1. In FIG. 2b, the touch point coordinates of the various touch points are indicated by dots for trajectory 51, "+" signs for trajectory 53, triangles for trajectory 55 and "*" signs for trajectory 55.

To carry out the data analysis, the analyzing means 7 is configured to analyse whether the touch point coordinates satisfy the relationship $$y_i = ax_i + b \pm \Delta \text{ or } x_i = c \pm \Delta$$

wherein $y_i$ and $x_i$ correspond to the touch point coordinates of touch point i in the predetermined number of consecutive touch point coordinates, a is a first constant, in particular an integer, b is a second constant, c is a third constant and $\Delta$ is a fourth constant, which could be different for x and y. $\Delta$ is typically linked to the precision of the single-touch localization system. The better the system's accuracy, the lower $\Delta$ can be.

In this embodiment, only three values for a are analyzed by the determining means to keep the computational power necessary for data analysis as low as possible. In this embodiment a is limited to 0, +1 and −1. Of course the parameter a could also take different values or even more, e.g. 10, or even 50 different values, but for most applications, it is sufficient to be able to identify one of these four directions. According to a further preferred embodiment, a takes the values 0, ±½, ±1, and ±2. Thus the system in this variant is configured to resolve eight liner directions. Compared to the situation in FIG. 3, additional linear directions in between the four illustrated in FIG. 3 can thus also be identified by the system.

According to an alternative to the described embodiment, the analysis whether or not a linear trajectory is present could also be achieved by fitting a linear equation on the touch point coordinates determined in step 21.

If the touch point coordinates are essentially positioned on a line, as illustrated in FIG. 3, then step 27 of the inventive method evaluates if the continuous touch event corresponds to a zoom event or not.

During this step, vectors for pairs of touch point coordinates, in particular for all pairs of touch points, wherein the starting point of a vector always relates to an earlier touch point than the end point of the vector, or for immediately successive touch point coordinates on the line, are determined. Further, based on the signs of scalar products obtained between vectors, it is determined whether a zoom gesture was provided by the user. Indeed in case a change in the sign for scalar product for two vectors is observed, two linear trajectories with opposing dragging directions must have occurred and are thus identified using the scalar product.

This situation is illustrated in FIG. 3, illustrating touch points 61 to 68 of a continuous touch event which follow essentially a line and that were determined one after the other by the determining means 5. Based on the touch points 61 to 68, a plurality of corresponding vectors 71 to 77 between immediately consecutive touch points can be formed. Scalar products 71.72, 72.73, 74.75 and 75.76 have a negative sign, whereas the scalar products 73.74 and 76.77 have a positive sign. The presence of scalar products with negative signs is a simple yet reliable way of identifying that a multi-touch touch event must have taken place.

Indeed for scalar products with a negative sign, it is evident that the starting point and the end point must belong to trajectories of different directions. The fact that several sign changes are observed further confirms this finding.

Thus, based on this simple analysis, the analyzing means 7 will be able to identify that touch points 61, 63 and 66 form one trajectory whereas touch points 62, 64, 65, 67 and 68 form a second trajectory.

The presence of two trajectories that occur essentially simultaneously but have different directions is furthermore indicating that the touch event relates to a multi-touch touch event. Thus, it is possible to identify a multi-touch touch gesture using a determining means 5 only capable of analyzing one touch at a time. In fact, the determining system 5 can only detect one touch point location out of the two touch events occurring simultaneously. Whether the determined touch point location belongs to the one or the other trajectory is arbitrary.

Instead or in addition to analyzing the vector properties, it is also possible to identify the presence of a multi-touch touch event by analyzing whether the x and/or y coordinates of touch points 61 to 68 only increase or only decrease from one point to the other or whether one or more changeovers can be observed. For instance, from point 61 to 62 both x and y coordinates increase, whereas from 62 to 63 both decrease. Again from 63 to 64 a changeover is observed as both x and y coordinates increase. Thus, in the presence of changeovers concerning the coordinates, the analyzing means 7 can decide that a multi-touch touch event took place.

In the presence of two essentially linear trajectories with different directions, it can then be determined during step 27 that the continuous touch event relates, for instance, to a zoom event (according to step b) of claim 1.

Next in the process (step 29), it is determined whether the zoom gesture relates to a zoom-in or zoom-out gesture.

During a zoom-in gesture, the user moves two of his fingers apart to e.g. magnify or enlarge the image displayed on the screen underlying the touch sensitive interface 3. During a zoom-out gesture, the user moves two of his fingers which initially are positioned away from each other closer together, to demagnify or reduce the image displayed on the screen.

To this end, as illustrated in FIGS. 5 and 6, the analyzing means 7 determines the position of the first (in time) touch point—point 81 in FIG. 5 and point 91 in FIG. 6—of the trajectory—83 in FIGS. 5 and 93 in FIG. 6—and the two extremities (in space) of the trajectory—85 and 87 in FIGS. 5 and 95 and 97 in FIG. 6. The two extremities 83, 85 and 93, 95 respectively thus correspond to the two touch points having maximum distance from each other.

If the touch point coordinates of the first touch point 81 are positioned within the line defined by the touch point coordinates 83 and 85 of FIG. 5, a zoom-in gesture is determined in step 31, as this situation corresponds to two fingers moving away with respect to each other. Accordingly, a zoom-in action command is output by the analyzing means 7 during step 33.

Further, if the touch point coordinates of the first touch point 91 are positioned at an extremity of the line defined by the touch point coordinates 93 and 95 in FIG. 6, a zoom-out gesture is determined in step 31, as the two fingers move towards each other. Accordingly a zoom-out action command is output by analyzing means 7 during step 35.

To further improve the method according to the invention, a further process step, according to variants of the embodiment, may be introduced any time between steps 21 and 29. This step consists in determining the distance between two consecutive touch point coordinates, e.g. by computing $\sqrt{(x_i-x_{i+1})^2+(y_i-y_{i+1})^2}$ or more approximately by computing $|x_i-x_{i+1}|+|y_i-y_{i+1}|$.

If, for at least one of the touch point coordinates, this value exceeds a certain predetermined value, a parallel movement of two fingers on the interaction surfaces during which the fingers move together along the same direction, can be excluded. Further, in the presence of a multi-touch touch event, the analyzing means 7 can be configured such that, consecutive touch points that have a distance less than the predetermined value, will be attributed to the same trajectory, whereas consecutive touch point coordinates that do not satisfy this criterion, will be attributed to different trajectories.

When only one direction is identified in the linear trajectory during step 27, the analyzing means 7 decides that a linear continuous single touch event has been provided by a user. A corresponding action command is output during step 37, typically relating to a flick action.

Further, depending on the direction of the trajectory, a flick from left to right or a flick from right to left or a flick from top to bottom or a flick from bottom to top can be attributed to the continuous touch event in step c). The flick from left to right or the flick from right to left corresponds to, for example, a short horizontal movement of a finger with respect to the interaction surface, thus corresponding to trajectory 53 in FIG. 3. The flick from top to bottom or the flick from bottom to top corresponds to, for example, a short vertical movement of a finger with respect to the interaction surface, thus corresponding to trajectory 51 in FIG. 3. From the time stamp of the individual touch points, the direction of the trajectories, up or down for trajectory 51 or left or right for trajectory 53 is unambiguously derivable.

If, during step 25, it is decided that the touch point coordinates do not form a linear trajectory, the process according to this embodiment continues with step 39 of FIG. 2. Step 39 consists in determining whether the trajectory of the touch event corresponds to an arc-shaped trajectory.

To be able to identify an arc shaped trajectory, the analyzing means 7 applies the following method according the invention.

The determining means 5 has identified the touch point coordinates of touch points 101 to 108 during step 21. The analyzing means then determines the distance d1 between one touch point and its next but one later touch point, e.g. the distance 111 between touch point 101 and 103, the distance 112 between touch point 102 and 104 and the distance 113 between touch point 103 and 105 for the series of touch point coordinates determined during step 21. Next the distance d2 between the touch point sandwiched between the touch points for which the distance has been determined, for instance the distance 114 between touch point 102 and the line defined by touch point 101 and 103, or the distance 115 between touch point 103 and the line defined by touch point 102 and 104.

The analyzing means 7 then decides that an arc shaped trajectory is present in case that the ratio d2/d1 and/or d2*d2/d1 is/are essentially constant, plus minus a predetermined value Δ for the touch point coordinates determined in step 21. Thus, for instance, 114/111=115/112 or **114*114/**

111=115*115/112 within the tolerance value Δ. Whereas the first ratio is a kind of a measure proportional to the angular velocity of the gesture, the second ratio provides an estimate proportional to the radius of the arc shaped gesture.

Steps 41 and 45 then consist in identifying whether a certain upper or lower angular threshold has been exceeded, to then instruct a rotation to the right or rotation to the left action in steps 43 and 47. The angle covered by the trajectory as illustrated in FIG. 7 can also be approximated by the analyzing means 7 using the values of the distances determined during step 39.

Like in the zoom event evaluation, according to an alternative, vectors for pairs of successive touch point coordinates, with the starting point corresponding to a touch point coordinate at an earlier stage than the end point, can be determined to identify whether or not the trajectory relates to an arc-shaped trajectory.

The angles between a succession of vectors 121, 122, 123, 124 and 125 as illustrated in FIG. 8 are added up, and if the sum exceeds a predetermined first threshold, it is decided during step 41 that a "rotation to the right gesture" has been provided by the user.

Accordingly, during step 43 the analyzing means 7 outputs a corresponding action command.

In case that the sum of angles is below the first threshold, the method according to the invention checks in step 45 whether the sum is below a second threshold, in which case the user has provided a "rotation to the left gesture" and the analyzing means 7 outputs a corresponding action command during step 47.

Eventually, the process can comprise a verification step, checking whether all angles have the same sign.

According to a further alternative, arc shaped gestures are identified using the following simplified approximation which is of particular interest in case small sized screens are used not needing a high resolution, e.g. for peripherics like printers, scanners, etc.

According to this alternative, only some of the touch points, e.g. three to five, identified in step 21 are used for the analysis step 39. Preferably, touch points at fixed intervals are chosen.

Using the x, y coordinates of the chosen touch points, the angle between two successive points out of this selection and the abscise is estimated by calculating the ratio between $(x_i - x_{i+1})$ and $(y_i - y_{i+1})$. Eventually, a second selection step is carried out to attribute one out of a predetermined amount of fixed angles, e.g. 16 different values, to the estimated angle, e.g. the one which is closest to the estimated angle.

The analyzing means 7 will then validate a rotation if the sum of the angles is higher than the abovementioned first threshold or lower than the abovementioned second threshold and if all angles have the same sign.

By doing this way, the calculation power necessary to identify the angular range covered by an arc shaped gesture can be further reduced as no trigonometric formulas have to be applied.

The rotation command output during steps 43 or 47 can either relate to a fixed value, e.g. rotate by 90° or by steps if further thresholds are crossed, but could also be proportional to the sum. A typical value for the first threshold is at least larger than 90° and for the second threshold less than −90°.

If, during step 39, no arc-shaped trajectory is detected, during step 49 it is decided that no, zoom, rotation or flick gesture was present. The same decision is taken in case the sum of angles determined in steps 41 and 45 is positioned in between the two thresholds.

The invention is not limited to the method as described with respect to FIGS. 2 to 7 but other command actions could be attributed to the various actions and/or the method can be limited to only some of the gestures, e.g. only detecting zoom and/or rotation.

With the inventive method, incorporated in a device like illustrated in FIG. 1, it becomes possible to identify complex gestures using only single-touch functionality even if the gestures are multi touch gestures like the zoom gesture. This is achieved by analyzing the relationship between the plurality of touch point coordinates. Furthermore the invention allows identifying linear and/or arc shaped trajectories with a simple process which can be carried out with simple electronic components, like 8 bit technology using components. Thus, even low-end devices can be equipped with touch sensitive interfaces capable of identifying complex gestures.

The invention claimed is:

1. A method for determining a touch gesture in a touch sensitive device comprising:
   determining a plurality of consecutive touch point coordinates of a multi-touch event on an interaction surface by analyzing each touch point coordinate one at a time as sensed single touches during the touch gesture;
   determining that the plurality of consecutive touch point coordinates satisfies the relationship:

$$y_i = ax_i + b \pm \Delta$$

or $$x_i = c \pm \Delta$$

wherein $y_i$ and $x_i$ correspond to touch point coordinates of touch point i of the plurality of consecutive touch point coordinates, a is a first constant, b is a second constant, c is a third constant, and Δ is a fourth constant, and
   wherein a is limited to discrete values of: less than 50, less than 10, or less than 5;
   determining a multi-touch touch pattern based on the relationship among the plurality of consecutive touch point coordinates; and
   attributing a predetermined action corresponding to the multi-touch touch pattern.

2. The method according to claim 1, further comprising:
   determining, within a predetermined duration, the multi-touch touch pattern in response to:
   a number of the plurality of consecutive touch point coordinates being greater than a minimum threshold value, or
   a distance between at least two consecutive touch point coordinates of the plurality of consecutive touch point coordinates being greater than a predetermined value.

3. The method according to claim 2, wherein the predetermined duration is from 400 ms to 800 ms.

4. The method according to claim 1, further comprising:
   determining that the plurality of consecutive touch point coordinates is approximately positioned on a line.

5. The method according to claim 1, wherein a is less than 5, and wherein a is limited to the values of:
   a=0, 1, or −1, or
   a=0, ½, −½, 1, −1, 2, or −2.

6. The method according to claim 1, wherein the determining the multi-touch touch pattern comprises determining a zoom event by identifying two approximately linear, simultaneous, trajectories with different directions in the multi-touch event.

7. The method according to claim 6, wherein the determining the zoom event comprises determining a changeover from increasing to decreasing coordinates $x_i$ and/or $y_i$, or a changeover from decreasing to increasing coordinates $x_i$ and/or $y_i$ wherein $y_i$ and $x_i$ correspond to touch point coordinates of touch point i of the plurality of consecutive touch point coordinates.

8. The method according to claim 6, wherein the determining the multi-touch touch pattern further comprises determining vectors for pairs of consecutive touch point coordinates of the plurality of consecutive touch point coordinates, wherein a starting point of a vector relates to touch point coordinates of an earlier touch point in the multi-touch event compared to an end point of the vector.

9. The method according to claim 8, further comprising:
determining scalar products between pairs of the vectors; and
determining scalar products with opposing signs.

10. The method according to claim 6, further comprising:
determining that touch point coordinates of a first touch point are positioned within a line defined by touch point coordinates at two extremities; and
attributing a zoom-in action to the zoom event.

11. A non-transitory computer readable medium having instructions stored therein which when executed by a processor cause the processor to perform operations for determining a touch gesture in a touch sensitive device, the operations comprising:
determining a plurality of consecutive touch point coordinates of a multi-touch event on an interaction surface by analyzing each touch point coordinate one at a time as sensed single touches during the touch gesture;
determining that the plurality of consecutive touch point coordinates satisfies the relationship:

$$y_i = ax_i + b \pm \Delta$$

or $$x_i = c \pm \Delta$$

wherein $y_i$ and $x_i$ correspond to touch point coordinates of touch point i of the plurality of consecutive touch point coordinates, a is a first constant, b is a second constant, c is a third constant, and $\Delta$ is a fourth constant, and
wherein a is limited to discrete values of: less than 50, less than 10, or less than 5;
determining a multi-touch touch pattern based on the relationship among the plurality of consecutive touch point coordinates; and
attributing a predetermined action corresponding to the multi-touch touch pattern.

12. A touch sensitive device comprising:
a computer readable media;
a processor coupled to the computer readable media;
a touch sensitive interaction surface coupled to the processor, wherein the processor is configured to:
determine a plurality of consecutive touch point coordinates of a multi-touch event on the touch sensitive interaction surface by analyzing each touch point coordinate one at a time as sensed single touches during a touch gesture;
determine that the plurality of consecutive touch point coordinates follows an arc-shaped trajectory;
determine a distance $d1_i$ between touch point coordinates i and i+2 of the plurality of consecutive touch point coordinates;
determine a distance $d2_i$ between touch point coordinates i+1 of the plurality of consecutive touch point coordinates and a line defined by the touch point coordinates i and i+2;
determine that the multi-touch event relates to an arc-shaped trajectory based on $d2_i/d1_i = d \pm \Delta$ and/or $d2_i * d2_i / d1_i = e \pm \Delta$ for the plurality of consecutive touch point coordinates, wherein i, i+1, and i+2 indicate three consecutive touch point locations of the plurality of consecutive touch point coordinates, d and e are constants, and $\Delta$ is a predetermined parameter;
determine a multi-touch touch pattern based on the arc-shaped trajectory among the plurality of consecutive touch point coordinates; and
attribute a predetermined action corresponding to the multi-touch touch pattern.

13. The touch sensitive device according to claim 12, wherein to determine the multi-touch touch pattern, the processor is further configured to determine vectors for pairs of consecutive touch point coordinates of the plurality of consecutive touch point coordinates, wherein a starting point of a vector relates to touch point coordinates of an earlier touch point in the multi-touch event compared to an end point of the vector.

14. The touch sensitive device according to claim 13, wherein to determine that the plurality of consecutive touch point coordinates follows the arc-shaped trajectory, the processor is further configured to
sum angles between successive vectors;
determine that the angles have a same sign; and
attribute a rotation action to the multi-touch touch pattern.

15. The touch sensitive device according to claim 13, wherein to determine the multi-touch touch pattern, the processor is further configured to:
sum angles between successive vectors;
determine that the sum satisfies a first predetermined threshold; and
attribute a positive rotation action to the multi-touch touch pattern in response to the sum satisfying the first predetermined threshold.

16. The touch sensitive device according to claim 15, wherein the processor is further configured to:
determine that the sum satisfies a second predetermined threshold; and
attribute a negative rotation action to the multi-touch touch pattern.

17. The touch sensitive device according to claim 12, wherein the processor is further configured to:
determine the plurality of consecutive touch point coordinates based on an analysis of acoustic signals.

* * * * *

UNITED STATES PATENT AND TRADEMARK OFFICE
CERTIFICATE OF CORRECTION

PATENT NO.        : 9,678,606 B2
APPLICATION NO.   : 13/641825
DATED             : June 13, 2017
INVENTOR(S)       : Franck Benhamouda Page 1 of 1

It is certified that error appears in the above-identified patent and that said Letters Patent is hereby corrected as shown below:

In the Claims

In Column 12, Line 36, replace "configured to" with --configured to:--.

Signed and Sealed this
Tenth Day of April, 2018

Andrei Iancu
*Director of the United States Patent and Trademark Office*